US012621527B2

(12) United States Patent
Paul et al.

(10) Patent No.: US 12,621,527 B2
(45) Date of Patent: May 5, 2026

(54) RE-CONSUMING CONTENT SUGGESTIONS

(71) Applicant: INTERNATIONAL BUSINESS MACHINES CORPORATION, Armonk, NY (US)

(72) Inventors: Connor Paul, Raleigh, NC (US); Harry Hoots, Raleigh, NC (US); Panav Setia, Southborough, MA (US); Jana H. Jenkins, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 320 days.

(21) Appl. No.: 18/238,164

(22) Filed: Aug. 25, 2023

(65) Prior Publication Data

US 2025/0071380 A1    Feb. 27, 2025

(51) Int. Cl.
H04N 21/466 (2011.01)
H04N 21/442 (2011.01)

(52) U.S. Cl.
CPC ... H04N 21/4668 (2013.01); H04N 21/44204 (2013.01); H04N 21/4662 (2013.01); H04N 21/4667 (2013.01)

(58) Field of Classification Search
CPC ......... H04N 21/4668; H04N 21/44204; H04N 21/4662; H04N 21/4667
USPC .......................................................... 725/46
See application file for complete search history.

(56) References Cited

U.S. PATENT DOCUMENTS 9,055,343 B1    6/2015  Lewis et al.
9,235,574 B2    1/2016  Green et al.
10,958,973 B2    3/2021  Hoots et al.
2012/0317123 A1    12/2012  Green et al.
2015/0350709 A1*    12/2015  Tomita ................. H04N 21/462
                                        725/32
2016/0300266 A1*    10/2016  Smalley ............. G06Q 30/0267
2017/0078750 A1*    3/2017  Ashkan ............ H04N 21/44204
2020/0389701 A1    12/2020  Hoots et al.
2021/0099407 A1    4/2021  Al Majid et al.

(Continued)

FOREIGN PATENT DOCUMENTS

CN    105550334    5/2016
CN    108134950    6/2018

OTHER PUBLICATIONS

Hershey, "Breaking Down the Netflix Algorithm: Why We Can't Stop Watching", https://tulanemagazine.com/breaking-down-the-netflix-algorithm-why-we-cant-stop-watching/, Apr. 21, 2021; 6 Pages.

(Continued)

*Primary Examiner* — Alfonso Castro

(74) *Attorney, Agent, or Firm* — Seed Intellectual Property Law Group LLP

(57)    ABSTRACT

Embodiments determine a user who is watching current content, receive content history of the user, calculate a consumption score (CS) based on series time, watch time, and consumption time of the content history, calculate a time to forget (TTF) threshold value based on the CS, the series time, and days since last viewed of the content history, compare the CS and the TTF threshold value to the current content watched by the user and current viewing habits of the user, and provide at least one suggestion to re-watch content of the content history based on the comparing.

20 Claims, 6 Drawing Sheets

(56)                    References Cited

U.S. PATENT DOCUMENTS

2021/0385541 A1    12/2021  Sayyadi
2024/0080528 A1*   3/2024  Bagga ................... H04N 21/47

OTHER PUBLICATIONS

Oh et al., "Broadcast Content Recommender System based on User's Viewing", http://dx.doi.org/10.5909/JEB.2012.17.1.129, Jan. 17, 2012; 11 Pages.
Netflix, "How Netflix's Recommendations System Works", https://help.netflix.com/en/node/100639, Page accessed May 24, 2023; 3 Pages.
Plummer, "This is how Netflix's top-secret recommendation system works", https://www.wired.co.uk/article/how-do-netflixs-algorithms-work-machine-learning-helps-to-predict-what-viewers-will-like#:~:text=Here's%20how%20it%20works.,genres%20to%20make%20its%20predictions, Aug. 22, 2017; 3 Pages.

* cited by examiner

100 ⬎

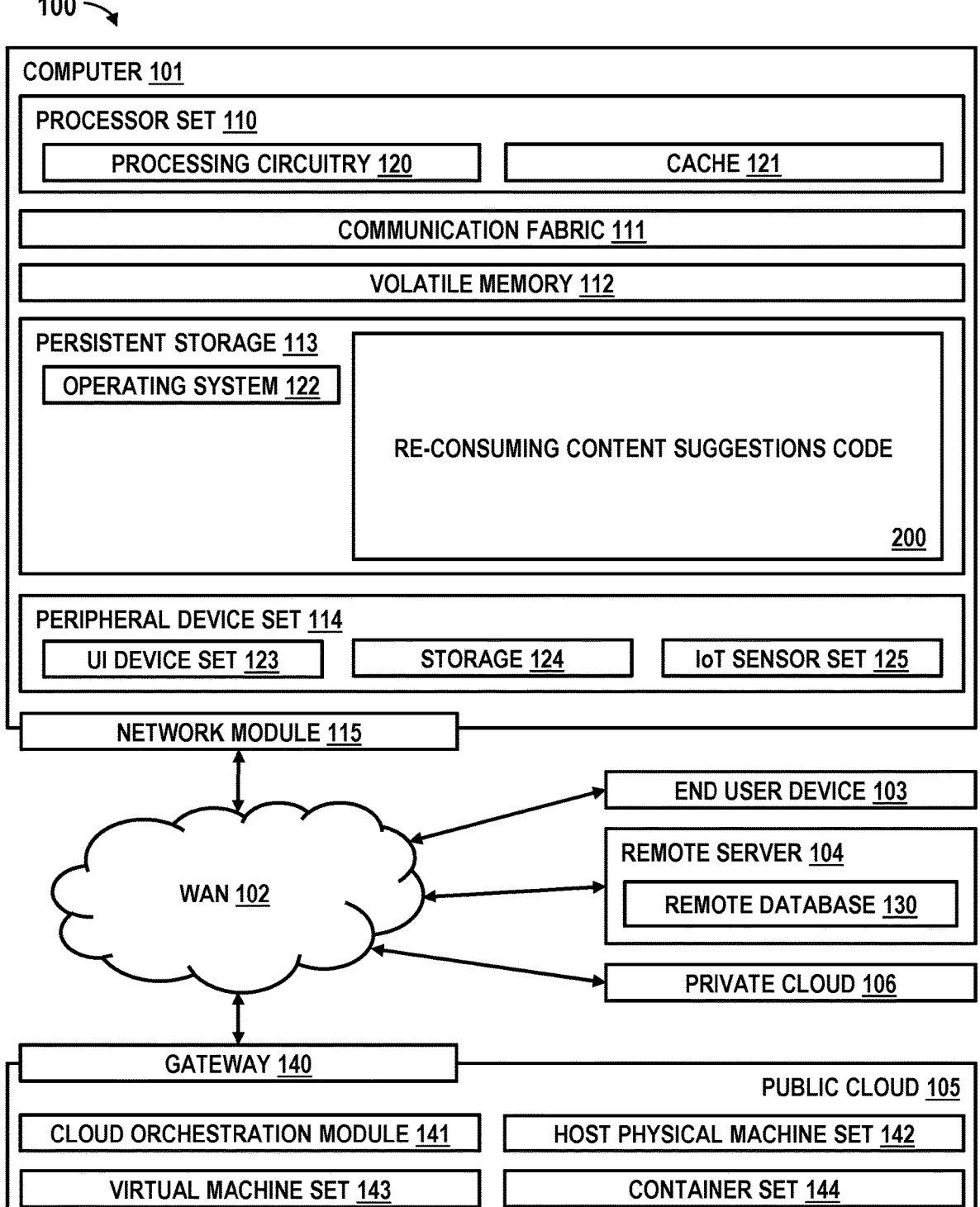

COMPUTER 101

PROCESSOR SET 110

PROCESSING CIRCUITRY 120      CACHE 121

COMMUNICATION FABRIC 111

VOLATILE MEMORY 112

PERSISTENT STORAGE 113

OPERATING SYSTEM 122

RE-CONSUMING CONTENT SUGGESTIONS CODE

200

PERIPHERAL DEVICE SET 114

UI DEVICE SET 123      STORAGE 124      IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141      HOST PHYSICAL MACHINE SET 142

VIRTUAL MACHINE SET 143      CONTAINER SET 144

FIG. 1

ANALYZE PAST CONTENT CONSUMED AND CALCULATE CONSUMPTION SCORE (CS) AND TIME TO FORGET (TTF) THRESHOLD VALUES — 405

MONITOR CURRENT CONTENT BEING CONSUMED — 410

COMPARE PAST CONTENT CONSUMED TO CURRENT CONTENT BEING CONSUMED — 415

SEND SUGGESTION FOR CONTENT RE-CONSUMPTION TO USER DEVICE — 420

DISPLAY SUGGESTION FOR CONTENT RE-CONSUMPTION — 425

RECEIVE SUGGESTION FOR CONTENT RE-CONSUMPTION AT USER DEVICE ⟋ 505

DISPLAY SUGGESTION FOR CONTENT RE-CONSUMPTION AT USER DEVICE ⟋ 510

SEND WATCHED CONTENT FROM USER DEVICE ⟋ 515

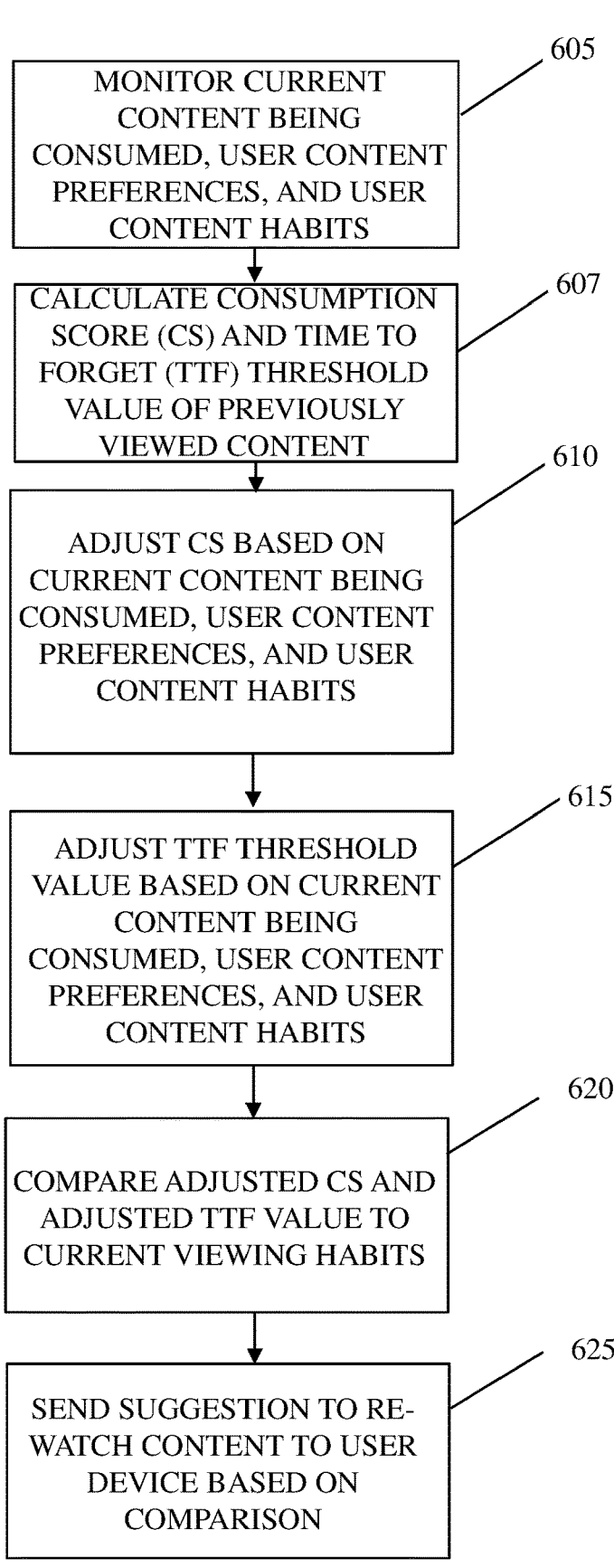

MONITOR CURRENT CONTENT BEING CONSUMED, USER CONTENT PREFERENCES, AND USER CONTENT HABITS — 605

CALCULATE CONSUMPTION SCORE (CS) AND TIME TO FORGET (TTF) THRESHOLD VALUE OF PREVIOUSLY VIEWED CONTENT — 607

ADJUST CS BASED ON CURRENT CONTENT BEING CONSUMED, USER CONTENT PREFERENCES, AND USER CONTENT HABITS — 610

ADJUST TTF THRESHOLD VALUE BASED ON CURRENT CONTENT BEING CONSUMED, USER CONTENT PREFERENCES, AND USER CONTENT HABITS — 615

COMPARE ADJUSTED CS AND ADJUSTED TTF VALUE TO CURRENT VIEWING HABITS — 620

SEND SUGGESTION TO RE-WATCH CONTENT TO USER DEVICE BASED ON COMPARISON — 625

FIG. 6

RE-CONSUMING CONTENT SUGGESTIONS

BACKGROUND

Aspects of the present invention relate generally to re-consuming content suggestions and, more particularly, to calculating re-watched content suggestions on a streaming platform.

Content streaming services have become a popular way for viewers to enjoy and consume favorite movies and shows. Content streaming refers to media content being delivered to computers and mobile devices via the Internet and played back in real time.

SUMMARY

In a first aspect of the invention, there is a computer-implemented method including: determining, by a processor set, a user who is watching current content; receiving, by the processor set, content history of the user; calculating, by the processor set, a consumption score (CS) based on series time, watch time, and consumption time of the content history; calculating, by the processor set, a time to forget (TTF) threshold value based on the CS, the series time, and days since last viewed of the content history; comparing, by the processor set, the CS and the TTF threshold value to the current content watched by the user and current viewing habits of the user; and providing, by the processor set, at least one suggestion to re-watch content of the content history based on the comparing.

In another aspect of the invention, there is a computer program product including one or more computer readable storage media having program instructions collectively stored on the one or more computer readable storage media. The program instructions are executable to: monitor current content being consumed by a user, user content preferences, and user content habits; calculate a consumption score (CS) and a time to forget (TTF) threshold value of previously viewed content; adjust the CS using an artificial intelligence (AI) model based on the current content being consumed, the user content preferences, and the user content habits; adjust the TTF threshold value using the AI model based on the current content being consumed, the user content preferences, and the user content habits; compare adjusted CS and the adjusted TTF threshold value to the user content habits; and sending at least one suggestion to re-watch previously viewed content based on the comparing.

In another aspect of the invention, there is a system including a processor set, one or more computer readable storage media, and program instructions collectively stored on the one or more computer readable storage media. The program instructions are executable to: determine a user who is watching current content; receive content history of the user; calculate a consumption score (CS) based on series time, watch time, and consumption time of the content history; calculate a time to forget (TTF) threshold value based on the CS, the series time, and days since last viewed of the content history; compare the CS and the TTF threshold value to the current content watched by the user and current viewing habits of the user; and provide at least one suggestion to re-watch content of the content history based on the comparing. The content history is previously viewed content by the user.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 1 depicts a computing environment according to an embodiment of the present invention.

FIG. 6 shows a flowchart of another exemplary method in accordance with aspects of the present invention.

DETAILED DESCRIPTION

Figure 2:
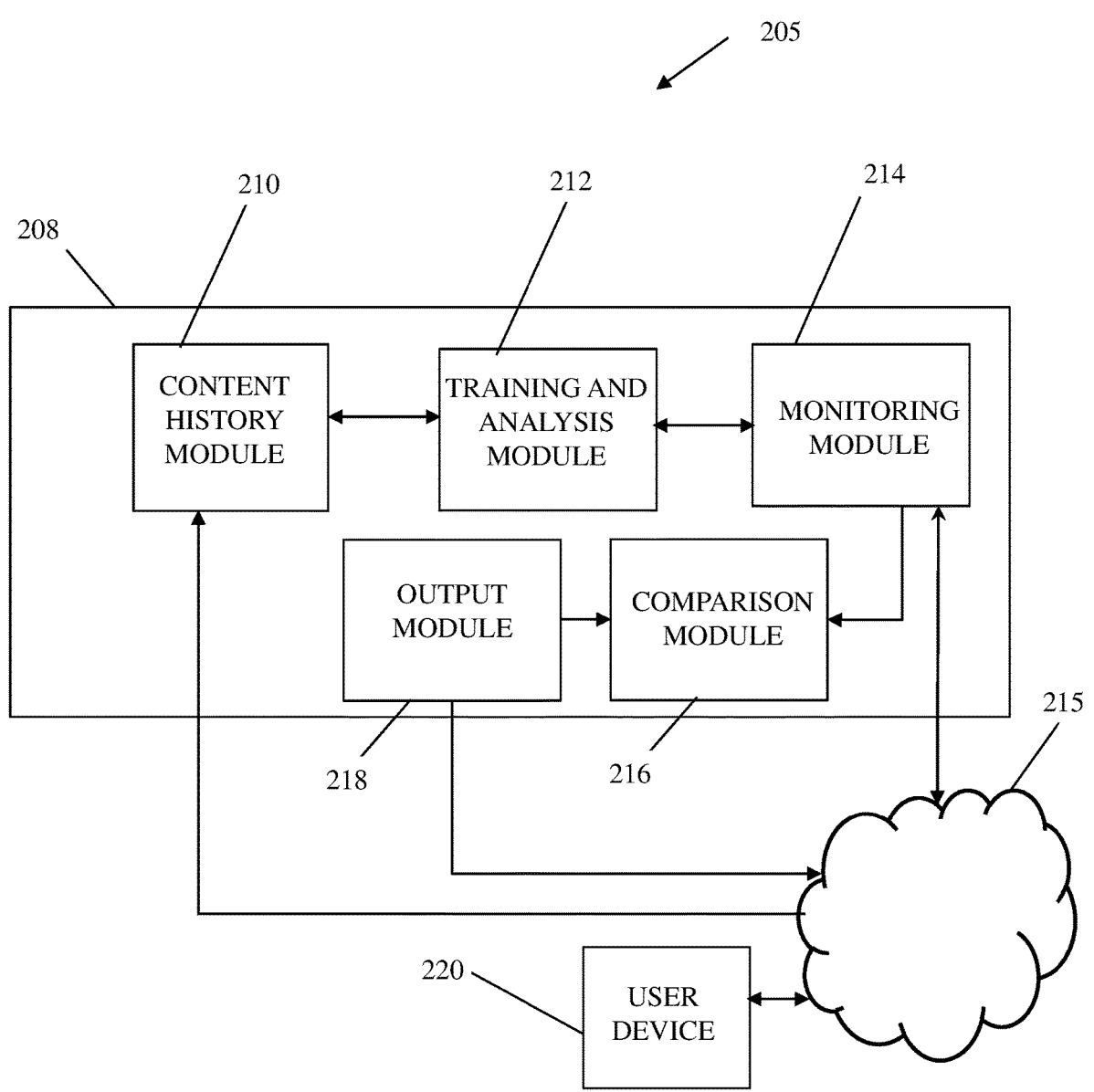
FIG. 2 shows a block diagram of an exemplary environment in accordance with aspects of the present invention.

Aspects of the present invention relate generally to re-consuming content suggestions and, more particularly, to calculating re-watched content suggestions on a streaming platform. Embodiments of the present invention allow for re-consuming content by considering past viewing habits of a user, comparing the past viewing habits of the user with current viewing habits of the user, and suggesting content for the user to re-watch that corresponds with at least one current content interest. Embodiments of the present invention analyze past consumed content, monitor current consumed content, compare the past consumed content with the current consumed content, and present suggestions for content re-consumption to the user. Embodiments of the present invention utilize a consumption score (CS) for consumed content, correlate the CS with current viewing habits of a user, and suggest re-consumption of content. In particular, embodiments of the present invention incorporate a speed of consumption in the CS. Embodiments of the present invention generate a time to forget (TTF) threshold value that is based on the speed of consumption of the user and real-time elapsed consumption speed to determine whether a user has forgotten about previously viewed content.

Embodiments of the present invention apply the TTF threshold value to several different scenarios. In specific embodiments, the TTF threshold value is utilized for learning and skills development. For example, the TTF threshold value is used to determine when to give training (e.g., diversity, equity, and inclusion training) on different platforms, such as YOURLEARNING™, etc. YOURLEARNING is a trademark of International Business Machines Corporation (IBM). In an example, the TTF threshold value is utilized for determining when to advertise to clients, when to host an event for a client, etc., based on a last communication the client has received (i.e., when a client is most likely to forget about the product, event, etc.). In another example, the TTF threshold value is utilized to determine when a user should refresh their driving skills when an elapsed time period has passed since obtaining a driving license (i.e., when the user is most likely to forget the driving skills learned in obtaining the driving license). In an example, the TTF threshold value is utilized to determine when to suggest a new video game which is related to an older video game that the user has played, but most likely has forgotten about. In another example, as discussed below, the TTF threshold value is utilized in a streaming platform to determine when a user has forgotten about consumed content.

Embodiments of the present invention utilize a TTF threshold value and a CS to suggest content for a user to re-watch. In contrast, conventional systems simply suggest previously viewed content without taking into account a TTF threshold value or a CS. In particular, as conventional systems do not incorporate the TTF threshold value, conventional systems are not able to suggest content for the user to re-watch after the user is most likely to have forgotten the content. Accordingly, conventional systems simply suggest the user re-watch content that has been most recently viewed. Embodiments of the present invention utilize the TTF threshold value and the CS to suggest content for the user to re-watch binged content after the user is most likely to have forgotten the binged content.

Embodiments of the present invention include a highly computationally efficient system, method, and computer program product for suggesting content for the user to re-watch after the user has likely forgotten about the content. Accordingly, implementations of the present invention provide an improvement (i.e., technical solution) to a problem arising in the technical field of providing content suggestions on a streaming platform. In particular, embodiments of the present invention utilize the TTF threshold value and the CS to suggest content for the user to re-watch. Also, embodiments of the present invention may not be performed in the human mind because aspects of the present invention comprise using an artificial intelligence (AI) model to adjust a time to forget (TTF) equation and a consumption score (CS) equation based on the viewing preferences and habits of the user. Further, these implementations of the present invention improve the functioning of the computer by incorporating the TTF threshold value and the CS to suggest content for the user to re-watch after the user is most likely to have forgotten the content.

Implementations of the present invention are necessarily rooted in computer technology. For example, the steps of adjusting the consumption score (CS) using an artificial intelligence (AI) model based on the current content being consumed, the user content preferences, and the user content habits and adjusting the TTF threshold value using the AI model based on the current content being consumed, the user content preferences, and the user content habits are computer-based and cannot be performed in the human mind. Training and using an AI model are, by definition, performed by a computer and cannot practically be performed in the human mind (or with pen and paper) due to the complexity and massive amounts of calculations involved. For example, the AI model in embodiments of the present invention may perform an iterative process of monitoring current viewing preferences and habits of the user and analyzing past viewing preferences and habits of the user to suggest content for the user to re-watch after the user is most likely to have forgotten the content. In particular, the AI model in embodiments of the present invention performs a large amount of processing of current and past content data and modeling of parameters to train the AI model such that the AI model generates an output in real time (or near real time). Given the scale and complexity of processing current and past content data and modeling of parameters, it is simply not possible for the human mind, or for a person using pen and paper, to perform the number of calculations involved in training and/or using the AI model.

Aspects of the present invention include a method, system, and computer program product for re-consuming content suggestions. For example, a computer-implemented method includes: gathering data for a user, including at least past content consumed, current content being consumed, and viewing habits of a user such as a time of day and a type of content consumed; generating consumption percentage for a first content using at least one of a rate and a length of the first content and a speed that the user consumes the first content; generating a time to forget (TTF) for the first content based on the consumption percentage for the first content, a length of the first content, and time elapsed since viewing the first content in order to determine when the user has forgotten about the content; compare TTF and the consumption percentage of the first content with current content types and viewing habits; and recommend the user to re-watch the first content when TTF has elapsed and current content consumed aligns with the first content type. The computer-implemented method may also include the speed that the user consumes the first content being used to determine whether the user has binged content or not binged content.

It should be understood that, to the extent implementations of the present invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as re-consuming content suggestions code of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 shows a block diagram of an exemplary environment 205 in accordance with aspects of the present invention. In embodiments, the environment 205 includes a re-consuming content server 208, which may comprise one or more instances of the computer 101 of FIG. 1. In other examples, the re-consuming content server 208 comprises one or more virtual machines or one or more containers running on one or more instances of the computer 101 of FIG. 1.

In embodiments, the re-consuming content server 208 of FIG. 2 comprises a content history module 210, a training and analysis module 212, a monitoring module 214, a comparison module 216, and an output module 218, each of which may comprise modules of the code of block 200 of FIG. 1. Such modules may include routines, programs, objects, components, logic, data structures, and so on that perform particular tasks or implement particular data types that the code of block 200 uses to carry out the functions and/or methodologies of embodiments of the present invention as described herein. These modules of the code of block 200 are executable by the processing circuitry 120 of FIG. 1 to perform the inventive methods as described herein. The re-consuming content server 208 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In FIG. 2, and in accordance with aspects of the present invention, the content history module 210, the monitoring module 214, and the output module 218 communicate with a user device 220 through a communication network 215. The communication network 215 may include various types of communication networks, such as the wide area network (WAN) 102 in FIG. 1, local area network (LAN), a telecommunication network, a wireless network, a public switched network, and/or a satellite network. The communication network 215 may include connections, such as wire, wireless, communication links, or fiber optic cables. The communication network 215 is an illustration of one implementation and modifications may be made based on design and implementation requirements. In embodiments, the user device 220 is similar to and corresponds with the end user device 103 in FIG. 1. In further embodiments, the user device 220 is a hardware device connected to a display. However, embodiments are not limited, and the user device 220 also may be integrated in the display as a software or firmware component.

In FIG. 2, and in accordance with aspects of the present invention, the content history module 210 receives previously viewed content from the user device 220 through the communication network 215. In further embodiments, the content history module 210 creates a tag for the previously viewed content that captures a genre, author, description, duration, etc., for the previously viewed content from the user device 220. Further, the content history module 210 keeps a record of a time of day the previously viewed content from the user device 220 was watched. For example, a user watches at least one cooking show during the daytime and watches at least one of horror movies and tv series at nighttime. The content history module 210 also maintains a list of previously viewed content (i.e., shows, series, movies, etc.) from the user device 220.

In FIG. 2, and in accordance with aspects of the present invention, the training and analysis module 212 receives the previously viewed content with a tag that captures a genre, author, description, duration, etc., from the content history module 210. The training and analysis module 212 receives the record of the time of day of the previously viewed content and the list of previously viewed content from the content history module 210. The training and analysis module 212 also receives the currently viewed content from the monitoring module 214. The training and analysis module 212 may determine a user who is currently watching content (i.e., which user is viewing a content of a streaming service) by analyzing viewing habits and remote control interaction of a user. For example, the training and analysis module 212 determines whether the user is a first age group (i.e., approximately 2 to 3 feet above the floor) or a second age group younger than the first age group (i.e., below 2 to 3 feet above the floor) based on a height of a remote control from a floor. In another example, the training and analysis module 212 monitors a viewing pattern of the user (e.g., whether the user watches an entire show, series, or movie completely (e.g., all the chapters of a movie) or changes to another content) to determine which user is currently viewing the content of the streaming service. In embodiments, the training and analysis module 212 determines that the user is a specific user if the user watches an entire sitcom show which is similar to or the same as a sitcom show the specific user has viewed in the past. The training and analysis module 212 also determines whether the determined user who is currently watching content has content history (i.e., previously viewed content) and creates a user profile for storing content history in response to determining that the determined user (who is currently watching content) has no content history.

In FIG. 2, and in accordance with aspects of the present invention, the training and analysis module 212 calculates a consumption score (CS) according to Equation 1 below:

$$\text{(Eq. 1)}$$

$$\text{Consumption Score } (CS) =$$

$$\sqrt{(\text{Series Time})} / \sqrt{(\text{Series Time} * (\text{Consumption Time} / \text{Watch Time}))}.$$

In Equation 1, the series time refers to the time of an entire series. For example, the series time may be 1000 minutes. Further, the watch time refers to the time the user has watched the entire series. For example, the watch time may be 900 minutes. The consumption time refers to a total time that has elapsed since the user has started watching the series. For example, the consumption time may be 1500 minutes. Accordingly, the CS for these values would be approximately 0.775. The value of the CS is in a range between greater than zero and less then or equal to one (i.e., Range of CS is 0<CS≤1).

In Equation 1, the CS is a range from zero to one in one example. In embodiments, the CS is a value of one in response to the user watching the entire series back to back with no breaks. The training and analysis module 212 determines that the user is less likely to be a binge viewer the lower the CS is from a value of one. In the example above, the training and analysis module 212 would determine that the user has binged the series based on the CS being approximately 0.775 (i.e., a user is determined to binge a series when the CS is greater than a first predetermined value). As an example, the first predetermined value may be 0.5.

In the Equation 1, the CS is a measure of binge viewing a series. However, in other embodiments, the training and analysis module 212 calculates the CS based on additional factors or different factors from the variables in Equation 1. In embodiments, the training and analysis module 212 determines that a higher CS correlates to a higher level of satisfaction with the content. In embodiments, the training and analysis module 212 calculates the CS by taking into consideration how many episodes in a row the user watches on average. In particular, the more episodes in a row that the user watches, the more the user enjoys the content. Also, the training and analysis module 212 calculates the CS by taking into consideration whether the user has watched multiple episodes in a row of a series without consuming any other content on the platform. In particular, if the user watches multiple episodes in the row of a series, the more likely the user enjoys the content. In other embodiments, the training and analysis module 212 calculates the CS by taking into consideration how many chapters of a movie the user watches. The training and analysis module 212 calculates the CS by determining whether the user consumes the content immediately or right after the content becomes available. In particular, even if the user has not watched the series for a predetermined time (i.e., a week), if the user consumes the content immediately or right after the content becomes available (i.e., right after a new episode has been released), the training and analysis module 212 determines that the user enjoys the content even if there is a gap in time from the user watching the series. In this scenario, the user may have watched every episode of the series, and must wait a week for a new episode to be released before consuming more content of that series. In embodiments, the training and analysis module 212 calculates the CS by determining whether the user has already re-consumed this content. In particular, if the user has already re-consumed this content, then the user is more likely to want to re-consume the content again in the future (i.e., the re-consuming content server 208 may suggest the re-consumed content at a certain time delay after the last re-consumption of the content). Also, the training and analysis module 212 calculates the CS by determining that the user is likely to re-consume other similar content in response to the user already re-consuming the content.

In FIG. 2, and in accordance with aspects of the present invention, the training and analysis module 212 also calculates a time to forget (TTF) threshold value according to Equation 2 below:

$$\text{Time to Forget } (TTF) \text{ threshold value} = \tag{Eq. 2}$$

$$(CS * \text{Series Time}) \wedge (\sqrt{(\text{Days since Last Viewed} / \text{Series Time})}).$$

In the Equation 2, the TTF threshold value is a measure of how likely the user is to forget content (e.g., a show, a series, a movie, etc.). The training and analysis module 212 determines that the higher the TTF threshold value, the more likely the user is to forget the content. The training and analysis module 212 determines that the user has forgotten the content based on the TTF threshold being greater than a second predetermined value. As an example, the second predetermined value may be 0.5.

In the Equation 2, the TTF threshold value is an exponential function in which the TTF threshold value is low when the days since last viewed is low and has an exponential increase in the TTF threshold value when the days since last viewed increases. For example, when the CS is 0.5, the series time is 300, and the days since last viewed is 1, TTF threshold value is 1.3. When the CS is 0.5, the series time is 300, and the days since last viewed is 20, TTF threshold value is 3.6. When the CS is 0.5, the series time is 300, and the days since last viewed is 50, TTF threshold value is 7.7. When the CS is 0.5, the series time is 300, and the days since last viewed is 100, TTF threshold value is 18. When the CS is 0.5, the series time is 300, and the days since last viewed is 200, TTF threshold value is 59.8. When the CS is 0.5, the series time is 300, and the days since last viewed is 300, TTF threshold value is 150.

In further embodiments of FIG. 2, the training and analysis module 212 calculates the TTF threshold value based on additional factors or different factors from the variables in Equation 2. In embodiments, the training and analysis module 212 determines that the TTF threshold value increases if the user has a higher CS (i.e., the user is more likely to have binged the content). In embodiments, the training and analysis module 212 determines that the TTF value decreases if the user has a low CS (i.e., the user is less likely to have binged the content). In embodiments, the training and analysis module 212 determines that as time passes (i.e., the time period increases) without consuming the content, the TTF threshold value also increases. In embodiments, the training and analysis module 212 determines that if the user watches an episode of series when it is released, the TTF threshold value decreases (i.e., the user has re-consumed the content when it is released, and therefore is not likely to forget the content). In embodiments, the training and analysis module 212 determines that if the user watches an episode of a series every day, the TTF threshold value decreases (i.e., the user has re-consumed the content every day, and therefore is not likely to forget the content). In embodiments, the training and analysis module 212 calculates that the TTF threshold value increases if the user stops consumption of the content. In embodiments, the training and analysis module 212 calculates that the TTF threshold value decreases if the user watches the content slowly over time (i.e., the user is less likely to forget the content).

In embodiments of FIG. 2, the training and analysis module 212 uses an artificial intelligence (AI) model to perform an iterative process of monitoring current viewing preferences and current habits of the user. Further, the training and analysis module 212 uses the AI model to perform an iterative process of analyzing past viewing preferences and past habits of the user. Accordingly, the training and analysis module 212 uses the iterative process of monitoring current viewing preferences and current habits of the user and analyzing past viewing preferences and past habits of the user to suggest content for the user to re-watch after the user is most likely to have forgotten the content. In particular, the training and analysis module 212 uses the AI model to adjust Equations 1 and 2 for the CS and the TTF threshold value based on the current viewing preferences and habits of the user and the past viewing preferences and habits of the user. For example, the AI model of the training and analysis module 212 determines that the user is binge viewing if the user is watching only one episode of the series every day for a specific time period, only watching the series during the specific time period, and not consuming any other content during the specific time period. In this scenario, the AI model of the training and analysis module 212 adjusts the CS of Equation 1 and the TTF threshold value of Equation 2 based on the determination of binge viewing. In particular, the AI model of the training and analysis module 212 increases the CS based on the user watching only the series during the time period and increases the TTF value a short time period after the user stops watching the series. In another example, the AI model of the training and analysis module 212 determines that a new season of a series will be released in a month and adjusts the CS of Equation 1 and the TTF threshold value of Equation 2 so that the user receives a suggestion to re-consume the old season of the series before the new season of the series will be released. In particular, the training and analysis module 212 increases the CS based on the new season of the series being released in a month and increases the TTF value a month before the new seasons of the series is released. In embodiments of FIG. 2, the training and analysis module 212 calculates the CS and the TTF threshold value and sends the CS and the TTF threshold value to the monitoring module 214. However, embodiments are not limited to these examples, and the AI model may adjust the CS and the TTF threshold value based on any current viewing preferences and current habits of the user and any past viewing preferences and past habits of the user.

In FIG. 2, and in accordance with aspects of the present invention, the monitoring module 214 monitors the currently viewed content and current habits of the user and sends the currently viewed content and the current habits to the training and analysis module 212 for analysis and calculation of the CS and the TTF threshold value. After the training and analysis module 212 calculates the CS and the TTF threshold value, the training and analysis module 212 sends the CS and the TTF threshold value to the monitoring module 214. The monitoring module 214 sends the CS, the TTF threshold value, and the currently viewed content and current habits of the user to the comparison module 216.

In FIG. 2, and in accordance with aspects of the present invention, the comparison module 216 compares the CS and the TTF threshold value to the currently viewed content and current habits of the user. For example, the comparison module 216 determines that the user is watching a current comedy sitcom and compares this current comedy sitcom to the CS and the TTF threshold value of another comedy sitcom that the user has previously viewed. The comparison module 216 determines that the CS and the TTF threshold value of another comedy sitcom the user has previously viewed is high enough (i.e., the CS and the TTF threshold value is greater than first and second predetermined values, respectively) and is similar to the currently viewed content and habits of the user (i.e., current comedy sitcom). In this scenario, the comparison module 216 provides a suggestion to the user to re-watch previously viewed content (i.e., another comedy sitcom) that the user may have previously binged watch and already forgotten about, and is similar to the currently viewed content (i.e., the current comedy sitcom). In another example, the comparison module 216 determines that the user is currently watching an action movie, is not watching a comedy sitcom in a long time (e.g., six months), and may not be currently interested in watching a comedy sitcom. In this scenario, the comparison module 216 does not provide the suggestion to the user to re-watch another comedy sitcom because the current viewing preferences and habits of the user do not include comedy sitcoms. The comparison module 216 sends the provided suggestions for the user to re-watch previously viewed content to the output module 218.

In FIG. 2, and in accordance with aspects of the present invention, the output module 218 receives the provided suggestions for the user to re-watch previously viewed content from the comparison module 216 and sends the provided suggestions for the user to re-watch previously viewed content to the user device 220 through the communication network 215. In embodiments, the user device 220 displays the provided suggestions for the user to re-watch previously viewed content as "Watch it Again". In other embodiments, the user device 220 sends the provided suggestions for the user to re-watch previously viewed content to a display for displaying the provided suggestions for the user to re-watch previously viewed content as "Watch it Again". The user device 220 then sends the viewed content to the content history module 210 through the communication network 215 for storing the previously viewed content.

Figure 3:
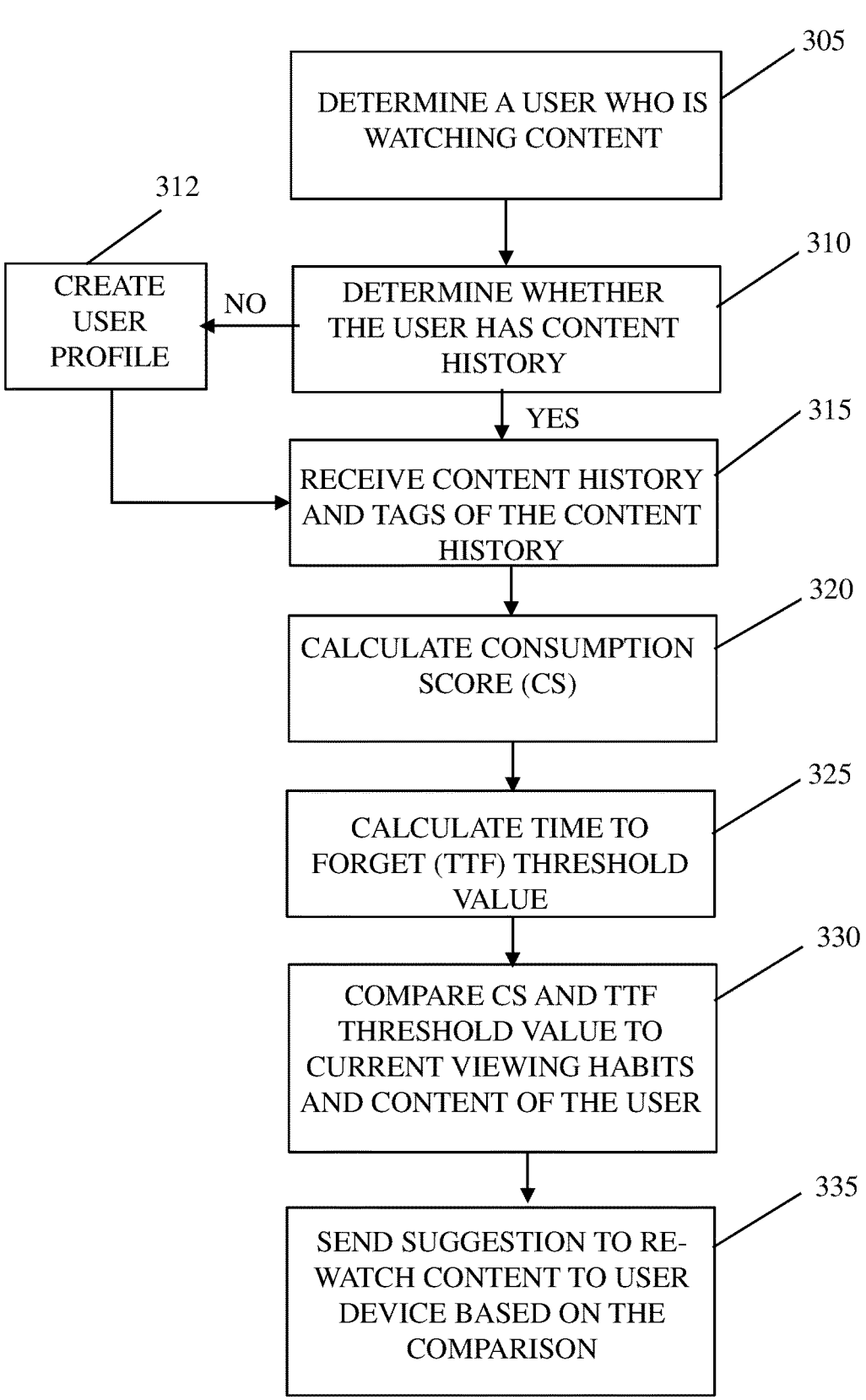
FIG. 3 shows a flowchart of an exemplary method in accordance with aspects of the present invention.

FIG. 3 shows a flowchart of an exemplary method of the re-consuming content server in accordance with aspects of the present invention. Steps of the method may be carried out in the environment of FIG. 2 and are described with reference to elements depicted in FIG. 2.

In embodiments, at step 305, the system determines, at the training and analysis module 212, a user who is currently watching content. In embodiments and as described with FIG. 2, the training and analysis module 212 determines the user who is currently watching content by analyzing at least one of viewing habits of the user and a remote control interaction from the user.

At step 310, the system determines, at the training and analysis module 212, whether the determined user has content history (i.e., previously viewed content of the determined user). At step 312, the system creates, at the training and analysis module 212, the user profile for storing content history in response to the determined user who is currently watching content not having any content history (i.e., NO at step 310). At step 315, the system receives, at the training and analysis module 212, content history and tags of the content history of the determined user who is currently watching content from the content history module 210 in response to the determined user who is currently watching content having content history (i.e., YES at step 310).

At step 320, the system calculates, at the training and analysis module 212, a consumption score (CS). In embodiments and described with respect to FIG. 2, the training and analysis module 212 calculates the CS according to Equation 1. Further, in other embodiments and as described with respect to FIG. 2, the training and analysis module 212 calculates and adjusts the CS according to various factors, such as how many episodes in a row have been watched, whether the user watches any other content, whether the content was consumed right after being released, whether the user has already re-consumed this content before or other content, whether the user is binging the content, whether a new season of a series will be released in the future, etc.

At step 325, the system calculates, at the training and analysis module 212, a time to forget (TTF) threshold value. In embodiments and described with respect to FIG. 2, the training and analysis module 212 calculates the TTF threshold value according to Equation 2. Further, in other embodiments and as described with respect to FIG. 2, the training and analysis module 212 calculates and adjusts the TTF threshold value according to various factors, such as the CS, how much a time period has increased, whether the user has consumed content when it is released, whether the user watches an episode of a series every day, stops consuming the content, watches the content slowly over time, whether the user has already re-consumed this content before or other content, whether the user is binging the content, watching one episode a day for a specific time period, whether a new season of a series will be released in the future, etc.

At step 330, the system compares, at the comparison module 216, the CS and the TTF threshold value to currently viewed content and current habits of the user. In embodiments and as described with FIG. 2, the comparison module 216 provides a suggestion to the user to re-watch previously viewed content in response to the CS and the TTF threshold value being greater than predetermined values and the currently viewed content being similar to the previously viewed content (e.g., same or similar genre, same author, etc.) based on the comparison. The comparison module 216 sends the provided suggestion for the user to re-watch previously viewed content to the output module 218. At step 335, the system sends, at the output module 218, the provided suggestion for the user to re-watch previously viewed content based on the comparison to the user device 220.

Figure 4:
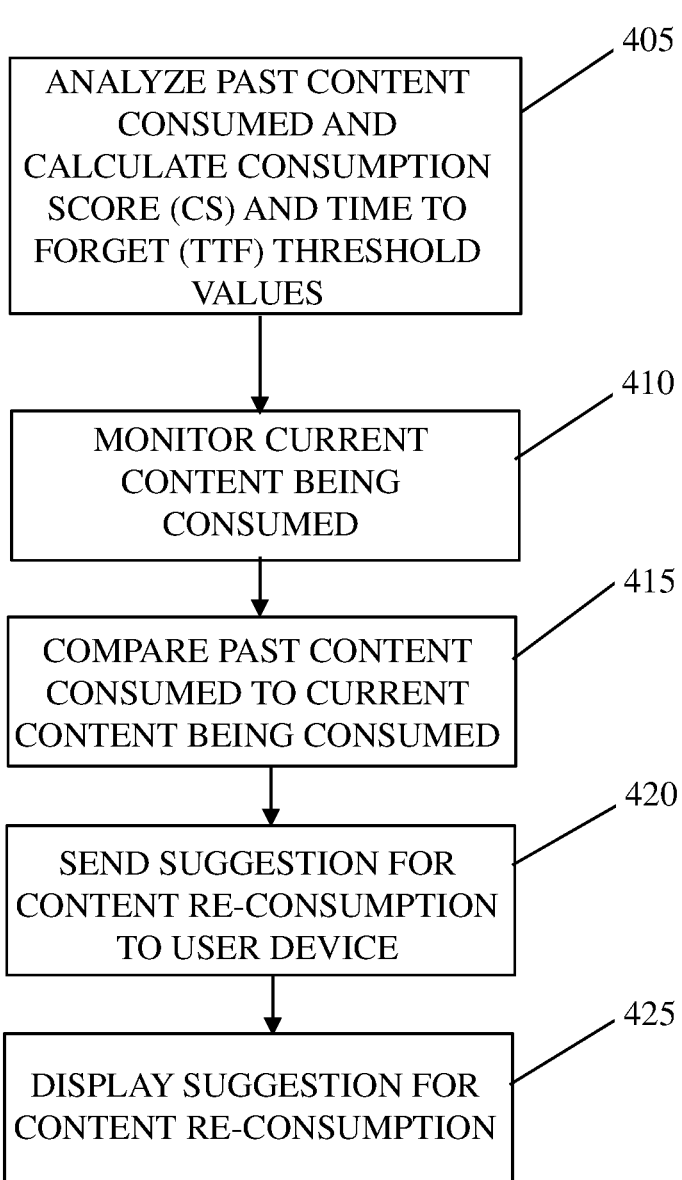
FIG. 4 shows a flowchart of another exemplary method in accordance with aspects of the present invention.

FIG. 4 shows a flowchart of another exemplary method of the re-consuming content server in accordance with aspects of the present invention. Steps of the method may be carried out in the environment of FIG. 2 and are described with reference to elements depicted in FIG. 2.

In embodiments of FIG. 4, at step 405, the system analyzes, at the training and analysis module 212, past content consumed (i.e., previously viewed content from the user), calculates the consumption score (CS) and the TTF threshold values, and send the CS and TTF threshold values to the monitoring module 214. In embodiments, at step 410, the system monitors, at the monitoring module 214, the current content being consumed and current habits of the user and sends the current content being consumed and the current habits, the CS, and the TTF threshold values to the comparison module 216.

In embodiments of FIG. 4, at step 415, the system compares, at the comparison module 216, the CS and the TTF threshold value to the current content and current habits of the user. In embodiments and as described with respect to FIG. 2, the comparison module 216 provides a suggestion to the user for content re-consumption (i.e., re-consume previously viewed content) that the user may have previously binged watch and already forgotten about and is similar to the current content based on the comparison. The comparison module 216 also sends the suggestion to the user for content re-consumption (i.e., re-consume previously viewed content) that the user may have previously binged watch and already forgotten about and is similar to the current content based on the comparison to the output module 218. In embodiments of FIG. 4, at step 420, the system sends, at the output module 218, the suggestion to the user device 220 for content re-consumption (i.e., re-consume previously viewed content) that the user may have previously binged watch and already forgotten about and is similar to the current content. At step 425, the system displays, at the user device 220, the suggestion for content re-consumption (i.e., re-consume previously viewed content) that the user may have previously binged and already forgotten about and is similar to the current content to the user.

Figure 5:
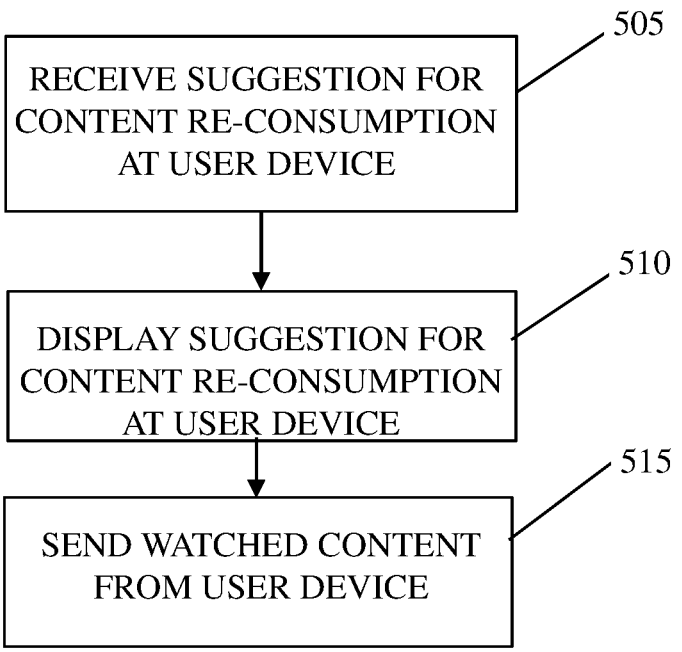
FIG. 5 shows a flowchart of another exemplary method in accordance with aspects of the present invention.

FIG. 5 shows a flowchart of another exemplary method of the user device in accordance with aspects of the present invention. Steps of the method may be carried out in the environment of FIG. 2 and are described with reference to elements depicted in FIG. 2.

In embodiments of FIG. 5, at step 505, the system receives, at the user device 220, a suggestion for content re-consumption. In embodiments and as described with respect to FIG. 2, the suggestion for content re-consumption comprises previously viewed content that the user may have previously binged and already forgotten about and is similar to the current content.

In embodiments of FIG. 5, at step 510, the system displays, at the user device 220, the suggestion for content re-consumption that the user previously viewed and binged and already forgotten about. The content re-consumption is also similar to the current content to the user (e.g., same or similar genre, author, etc.). In embodiments of FIG. 5, at step 515, the system sends, at the user device 220, the watched content to the content history module 210 through the communication network 215 for storing the previously viewed content.

FIG. 6 shows a flowchart of another exemplary method of the re-consuming content server in accordance with aspects of the present invention. Steps of the method may be carried out in the environment of FIG. 2 and are described with reference to elements depicted in FIG. 2.

In embodiments of FIG. 6, at step 605, the system monitors, at the monitoring module 214, the current content being consumed, user content preferences, and user current habits and sends the current content being consumed, user preferences, and user content habits to the training and analysis module 212. At step 607, the system calculates, at the training and analysis module 212, a consumption score (CS) of previously viewed content based on Equation 1 and a time to forget (TTF) threshold value of the previously viewed content based on Equation 2. However, embodiments are not limited to this example, and the training and analysis module 212 may calculate the CS and the TTF threshold value based on different parameters than Equations 1 and 2 or additional factors with regards to Equations 1 and 2.

In embodiments of FIG. 6, at step 610, the system adjusts, at an artificial intelligence (AI) model of the training and analysis module 212, a CS calculated based on the current content being consumed, user content preferences, and user content habits of the user. In embodiments of FIG. 6, at step 615, the system adjusts, at the AI model of the training and analysis module 212, a time to forget (TTF) threshold value based on the current content being consumed, user content preferences, and user content habits of the user.

In embodiments of FIG. 6, at step 620, the system compares, at the comparison module 216, the adjusted CS and the adjusted TTF threshold value to the current viewing habits of the user. In embodiments and as described with respect to FIG. 2, the comparison module 216 provides a suggestion to the user to re-watch content that the user has previously binged watch and has already forgotten about based on the comparison and sends the suggestion to the output module 218.

In embodiments of FIG. 6, at step 625, the system sends, at the output module 218, the suggestion to the user device 220 for the user to re-watch previously viewed content that the user may have previously binged watch and already forgotten about based on the comparison.

In embodiments, a service provider could offer to perform the processes described herein. In this case, the service provider can create, maintain, deploy, support, etc., the computer infrastructure that performs the process steps of the present invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the present invention provides a computer-implemented method, via a network. In this case, a computer infrastructure, such as computer 101 of FIG. 1, can be provided and one or more systems for performing the processes of the present invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

determining, by a processor set, a user who is watching current content;

receiving, by the processor set, content history of the user;

calculating, by the processor set, a consumption score (CS) based on series time, watch time, and consumption time of the content history;

adjusting, by the processor set, the CS using an artificial intelligence (AI) model based on the user watching a specific series of the current content during a predetermined time period and the user not watching any other content during the predetermined time period;

calculating, by the processor set, a time to forget (TTF) threshold value based on the adjusted CS, the series time, and days since last viewed of the content history;

comparing, by the processor set, the adjusted CS and the TTF threshold value to the current content watched by the user and current viewing habits of the user; and providing, by the processor set, at least one suggestion to re-watch content of the content history based on the comparing.

2. The computer-implemented method of claim 1, wherein the determining the user who is watching the current content comprises analyzing viewing habits of the user to determine the user who is watching the current content, and the CS is further calculated based on √(Series Time)/(Series Time√(Consumption Time/Watch Time)).

3. The computer-implemented method of claim 1, wherein the determining the user who is watching the current content further comprises analyzing a remote control interaction from the user to determine the user who is watching the current content, and the TTF threshold value is further calculated based on (CS\*Series Time)^(√(Days since Last Viewed/Series Time)).

4. The computer-implemented method of claim 1, further comprising:

receiving tags of the content history;

comparing at least one tag of the tags of the content history with at least one tag of the current content; and matching the at least one tag of the content history with the at least one tag of the current content to provide the at least one suggestion, wherein the tags comprise a genre, author, description, and duration of the content history.

5. The computer-implemented method of claim 1, wherein the comparing the CS and the TTF threshold value to the current content watched by the user and current viewing habits of the user comprises:

determining that the CS is greater than a first predetermined value;

determining that the TTF threshold value is greater than a second predetermined value; and determining that the at least one suggestion has a same genre as the current content watched by the user.

6. The computer-implemented method of claim 1, wherein the comparing the CS and the TTF threshold value to the current content watched by the user and current viewing habits of the user comprises:

determining that the CS is greater than a first predetermined value;

determining that the TTF threshold value is greater than a second predetermined value; and determining that the at least one suggestion has a same author as the current content watched by the user.

7. The computer-implemented method of claim 1, wherein the content history comprises previously viewed content by the user.

8. The computer-implemented method of claim 1, wherein the content history and the current content comprise a series with a plurality of episodes.

9. The computer-implemented method of claim 1, further comprising adjusting the TTF threshold value using the AI model based on the user watching the specific series of the current content during the predetermined time period and the user not watching any other content during the predetermined time period.

10. The computer-implemented method of claim 1, further comprising adjusting the TTF threshold value using an artificial intelligence (AI) model based on a new season of a specific series of the current content being released at a predetermined time period from a current date.

11. The computer-implemented method of claim 10, further comprising adjusting the CS using the AI model based on the new season of the specific series of the current content being released at the predetermined time period from the current date.

12. A computer program product comprising one or more computer readable storage media having program instructions collectively stored on the one or more computer readable storage media, the program instructions executable to:

monitor current content being consumed by a user, user content preferences, and user content habits;

calculate a consumption score (CS) and a time to forget (TTF) threshold value of previously viewed content of the user;

adjust the CS using an artificial intelligence (AI) model based on the current content being consumed, the user content preferences, and the user content habits;

adjust the TTF threshold value using the AI model based on the current content being consumed, the user content preferences, and the user content habits;

compare the adjusted CS and the adjusted TTF threshold value to the user content habits; and sending at least one suggestion to re-watch previously viewed content based on the comparing.

13. The computer program product of claim 12, wherein the previously viewed content and the current content being consumed by the user comprise a series with a plurality of episodes, and the CS is further calculated based on a predefined function of series time, consumption time, and watch time.

14. The computer program product of claim 12, wherein the previously viewed content and the current content being consumed by the user comprise a movie with a plurality of chapters, and the TTF threshold value is further calculated based on the CS, series time, and days since last viewed.

15. The computer program product of claim 12, wherein the adjusting the CS using the AI model based on the current content being consumed, the user content preferences, and the user content habits comprises adjusting the CS using the AI model based on the user watching a specific series of the current content during a predetermined time period the user not watching any other content during the predetermined time period.

16. The computer program product of claim 12, wherein the adjusting the TTF threshold value using the AI model based on the current content being consumed, the user content preferences, and the user content habits comprises adjusting the TTF threshold value using the AI model based on the user watching a specific series of the current content during a predetermined time period the user not watching any other content during the predetermined time period.

17. The computer program product of claim 12, wherein the adjusting the CS using the AI model based on the current content being consumed, the user content preferences, and the user content habits comprises adjusting the CS using the AI model based on a new season of a specific series of the current content being released at a predetermined time period from a current date.

18. The computer program product of claim 12, wherein the adjusting the TTF threshold value score using the AI model based on the current content being consumed, the user content preferences, and the user content habits further comprises adjusting the TTH threshold value using the AI model based on a new season of a specific series of the current content being released at a predetermined time period from a current date.

19. A system comprising:

a processor set, one or more computer readable storage media, and program instructions collectively stored on the one or more computer readable storage media, the program instructions executable to:

determine a user who is watching current content;

receive content history of the user;

calculate a consumption score (CS) based on series time, watch time, and consumption time of the content history;

adjust the CS using an artificial intelligence (AI) model based on the user watching a specific series of the current content during a predetermined time period and the user not watching any other content during the predetermined time period;

calculate a time to forget (TTF) threshold value based on the adjusted CS, the series time, and days since last viewed of the content history;

compare the adjusted CS and the TTF threshold value to the current content watched by the user and current viewing habits of the user; and provide at least one suggestion to re-watch content of the content history based on the comparing, wherein the content history is previously viewed content by the user.

20. The system of claim 19, wherein the CS is further calculated based on $\sqrt{(\text{Series Time})}/\sqrt{(\text{Series Time}*(\text{Consumption Time}/\text{Watch Time}))}$, and the TTF threshold value is further calculated based on $(\text{CS}*\text{Series Time})^{(\sqrt{(\text{Days since Last Viewed}/\text{Series Time}))}}$.

* * * * *